United States Patent [19]
Maase et al.

[11] Patent Number: 5,528,355
[45] Date of Patent: Jun. 18, 1996

[54] ELECTRO–OPTIC PALM SCANNER SYSTEM EMPLOYING A NON–PLANAR PLATEN

[75] Inventors: Daniel F. Maase, Campbell; Thomas F. Sartor, Sunnyvale, both of Calif.

[73] Assignee: Idnetix Incorporated, Sunnyvale, Calif.

[21] Appl. No.: 209,804

[22] Filed: Mar. 11, 1994

[51] Int. Cl.$^6$ .................................................. G06K 9/00
[52] U.S. Cl. ............................................ 356/71; 382/115
[58] Field of Search ................................ 356/71; 782/115, 782/124, 125, 126, 127

[56] References Cited

U.S. PATENT DOCUMENTS

| | | | |
|---|---|---|---|
| 3,581,282 | 5/1971 | Altman | 340/149 |
| 3,677,154 | 7/1972 | Lee et al. | 95/1.1 |
| 3,804,524 | 4/1974 | Jocoy et al. | 356/138 |
| 3,867,164 | 2/1975 | Orlando et al. | 117/0.5 |
| 3,975,711 | 8/1976 | McMahon | 340/146.3 |
| 4,032,889 | 6/1977 | Nassimbene | 340/146.3 |
| 4,152,056 | 5/1979 | Fowler | 354/62 |
| 4,186,378 | 1/1980 | Moulton | 340/146.3 E |
| 4,227,805 | 10/1980 | Schiller | 356/71 |
| 4,537,484 | 8/1985 | Fowler et al. | 354/62 |
| 4,792,226 | 12/1988 | Fishbine et al. | 356/71 |
| 5,067,162 | 11/1991 | Driscoll, Jr. et al. | 382/5 |
| 5,335,288 | 8/1994 | Faulkner | 362/4 |

*Primary Examiner*—Richard A. Rosenberger
*Attorney, Agent, or Firm*—William J. Egan, III; Fish & Richardson

[57] ABSTRACT

An electro-optic palm scanner system employing a non-planar platen for obtaining high quality palmprints and heelprints. The platen includes an upper contact surface having a convex portion for contacting a palm to be imaged, and a planar portion for contacting the heel of the hand. The imaging system includes an optical carriage movably secured to a frame. The carriage supports a light source, lens system, and light detector. Total internal reflection occurs when light is incident on the platen at an angle greater than a critical angle of the platen, providing identifying information. The detector may include a linear CCD array which detects ridges and valleys in the hand to obtain image data. The image data is processed and the corresponding print of the heel or hand may be displayed on a video screen, and stored. The images of the palm and heel may be merged to form a single image.

20 Claims, 12 Drawing Sheets

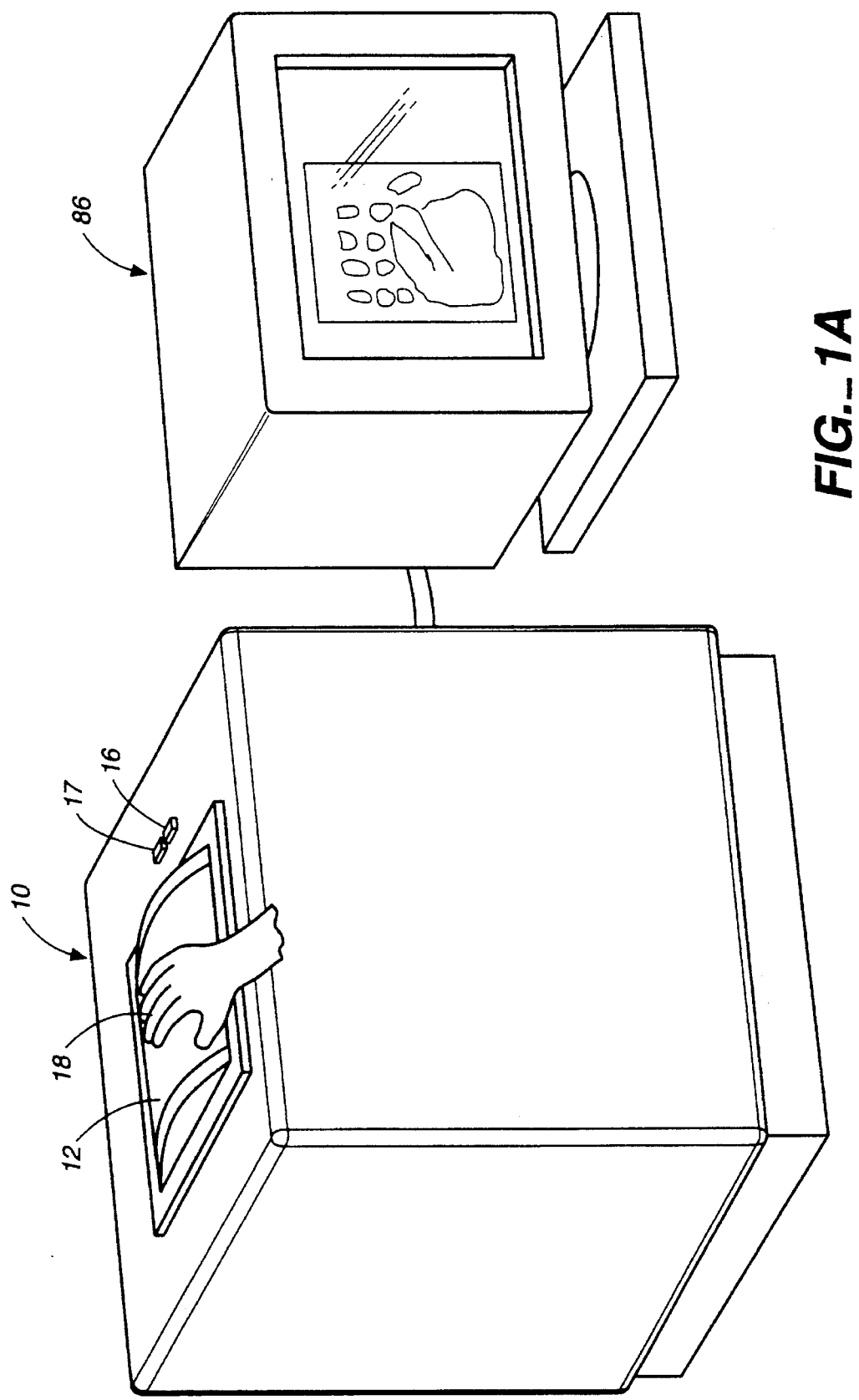
FIG._1A

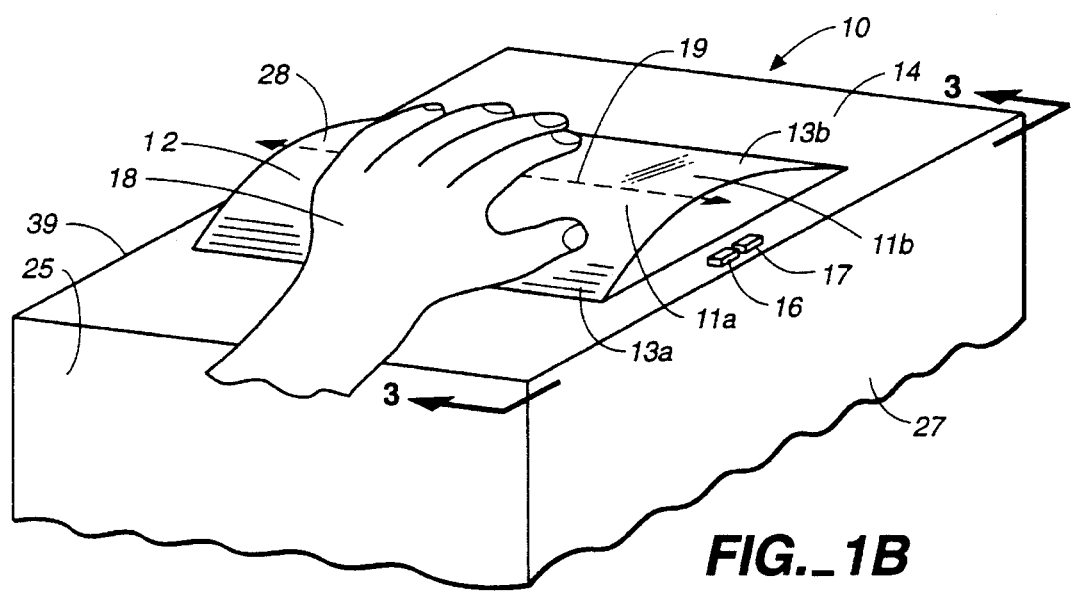
FIG._1B
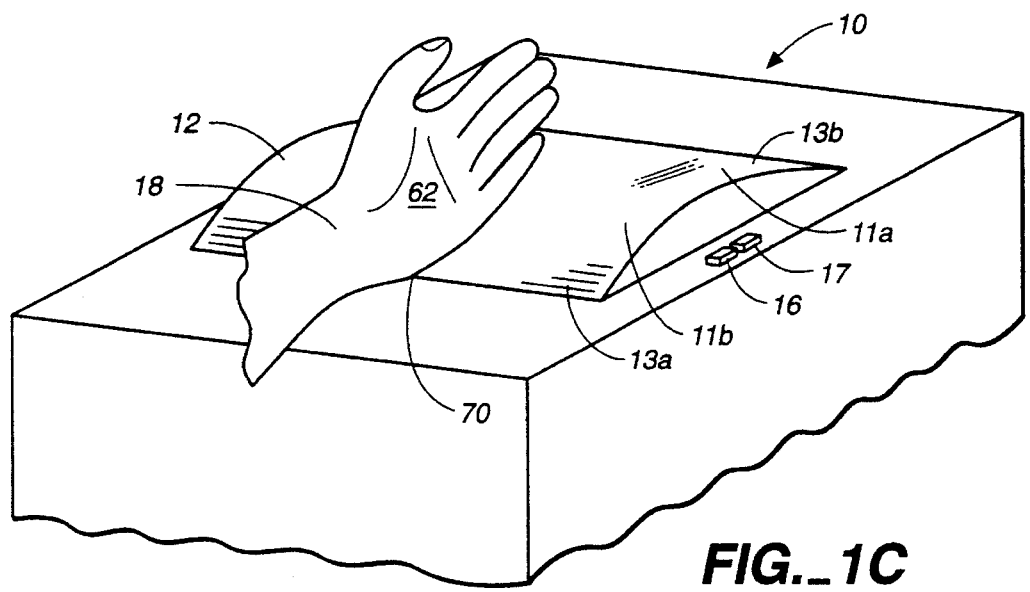
FIG._1C

FIG._2A
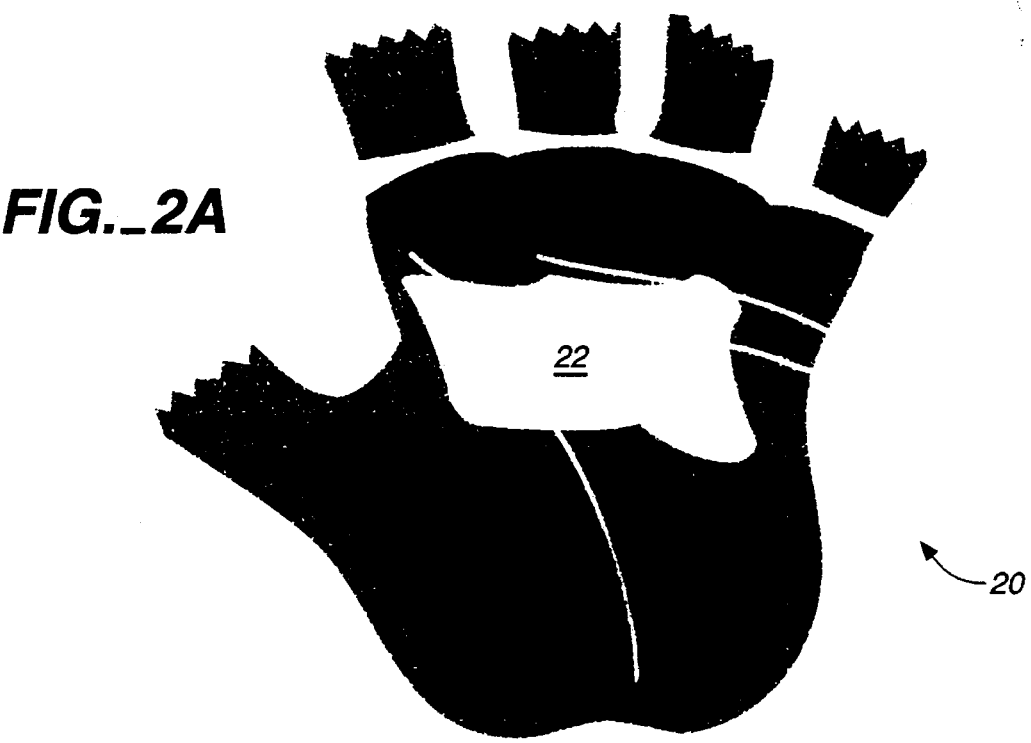
FIG._2B
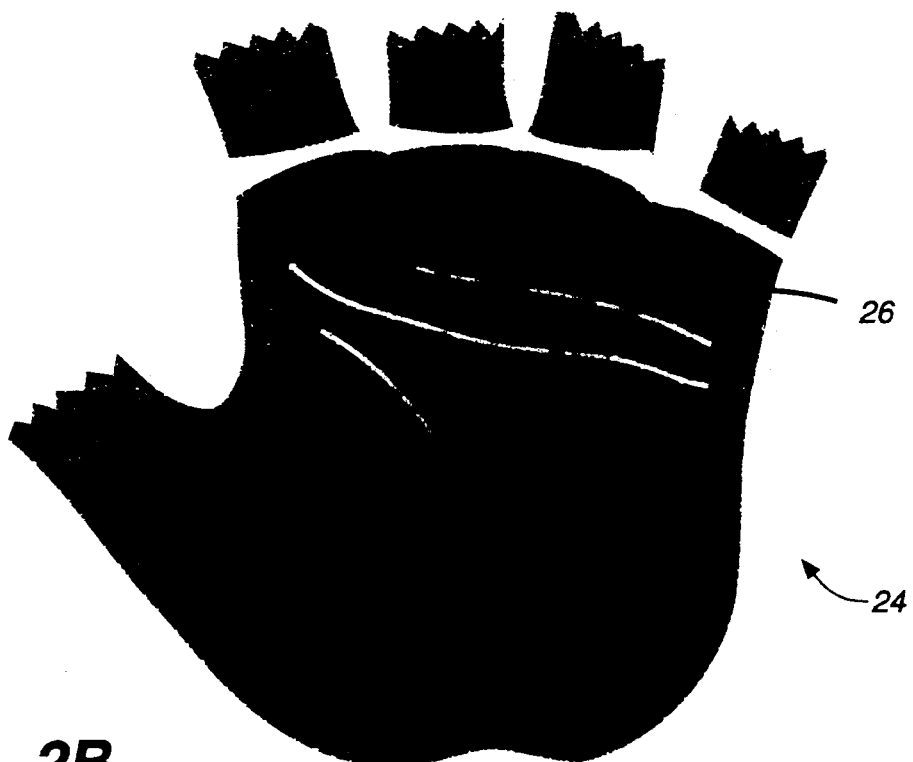

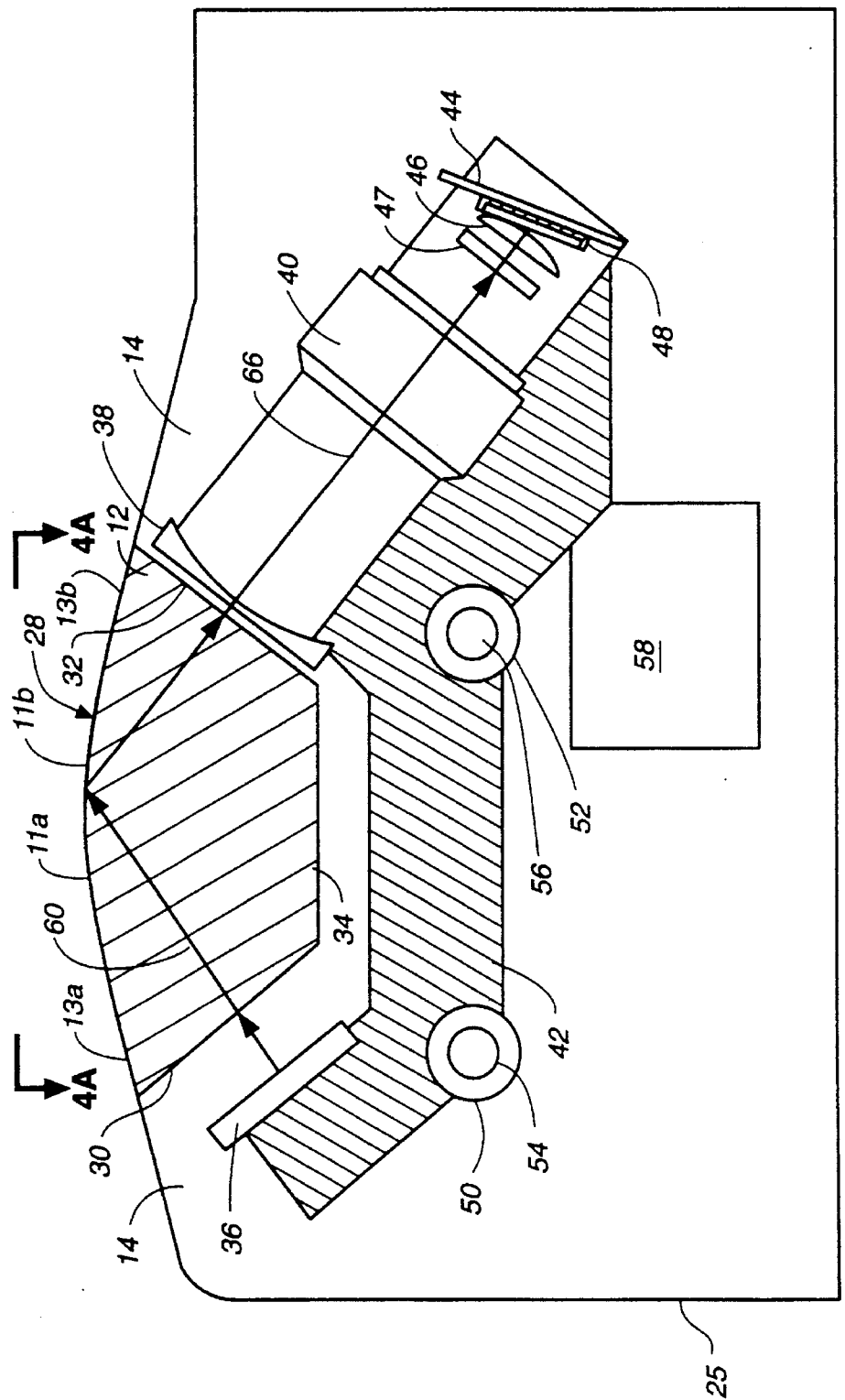
FIG._3

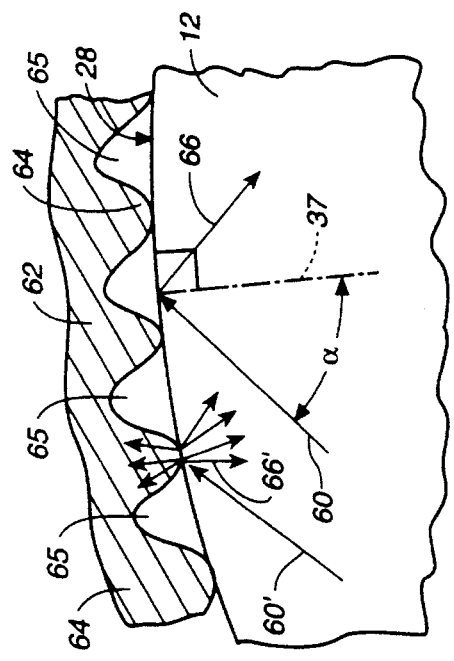
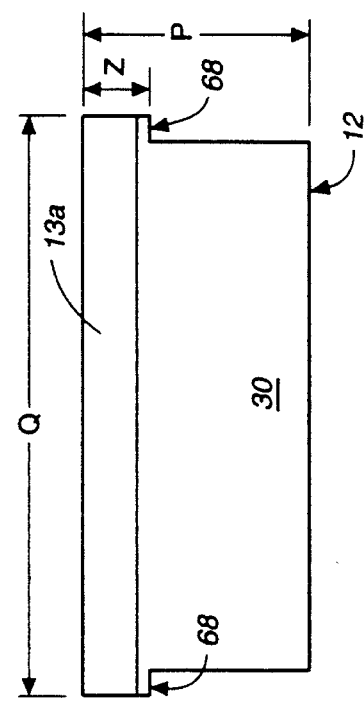
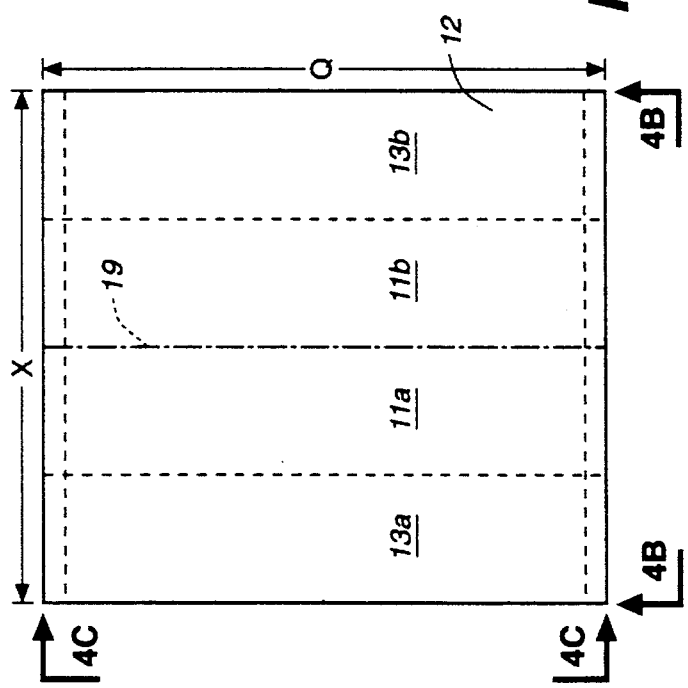
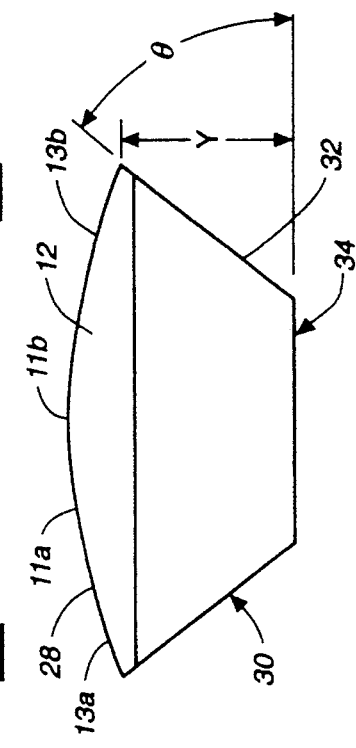
FIG._5
FIG._4C
FIG._4A
FIG._4B

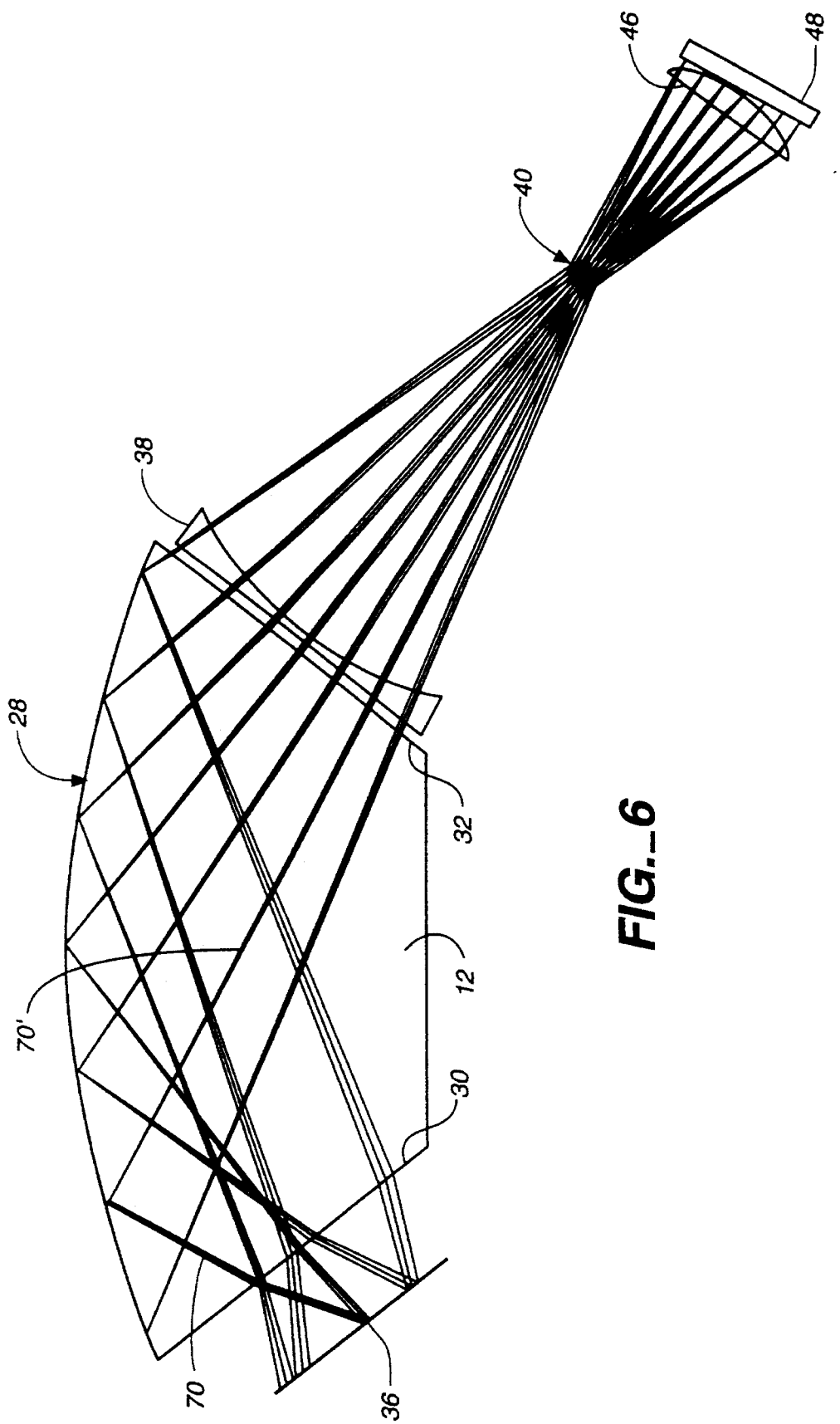
FIG._6

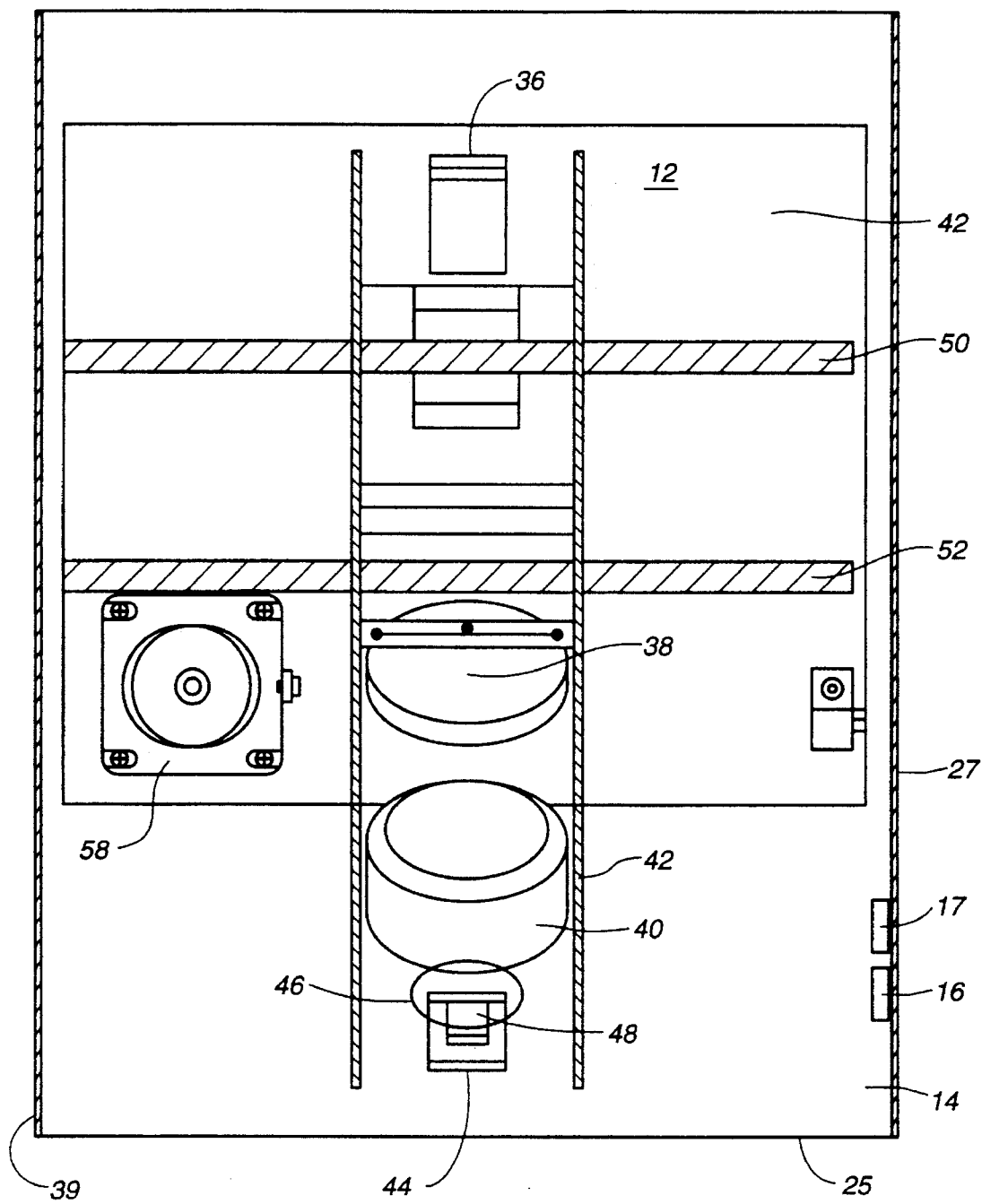
FIG._7

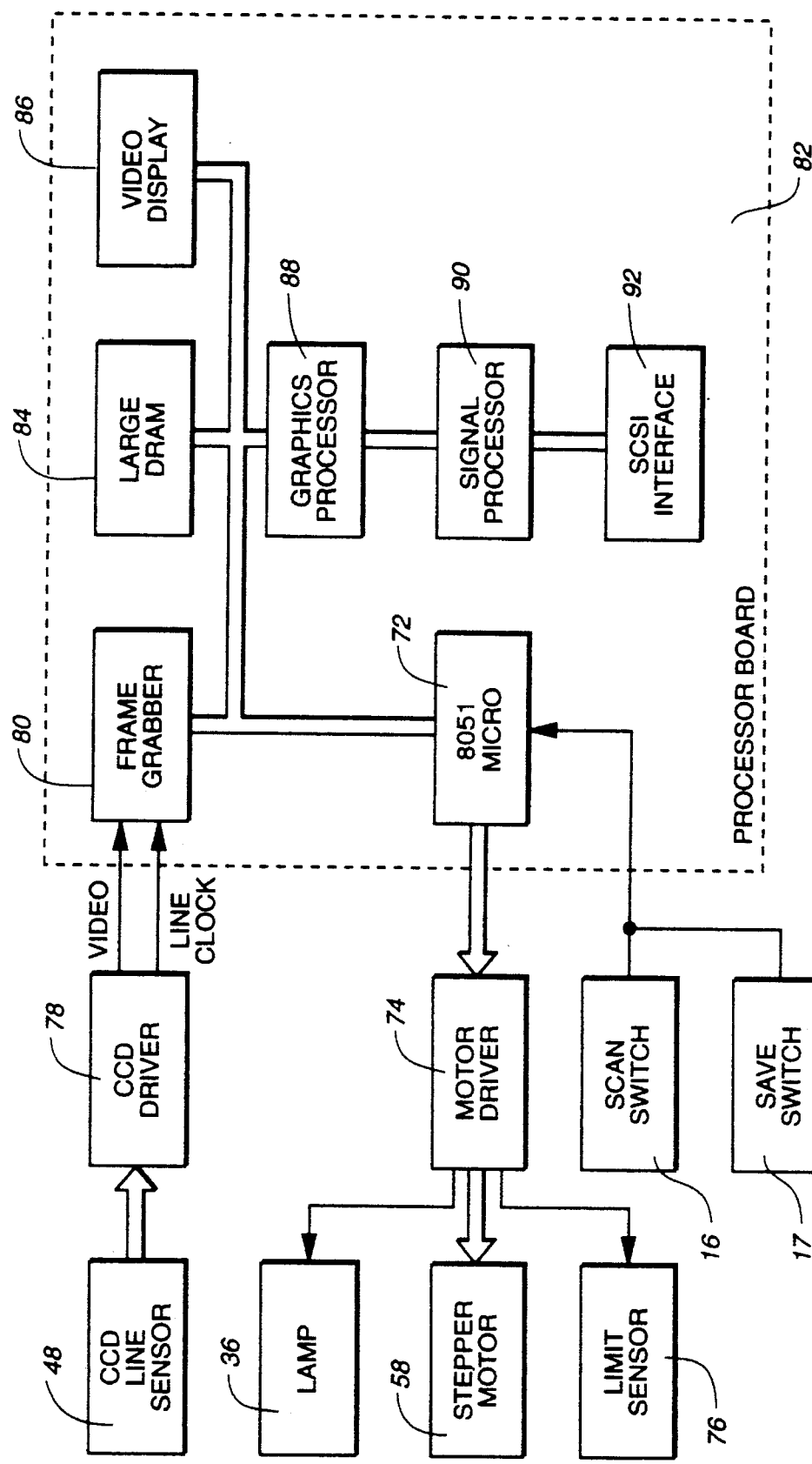
FIG._8

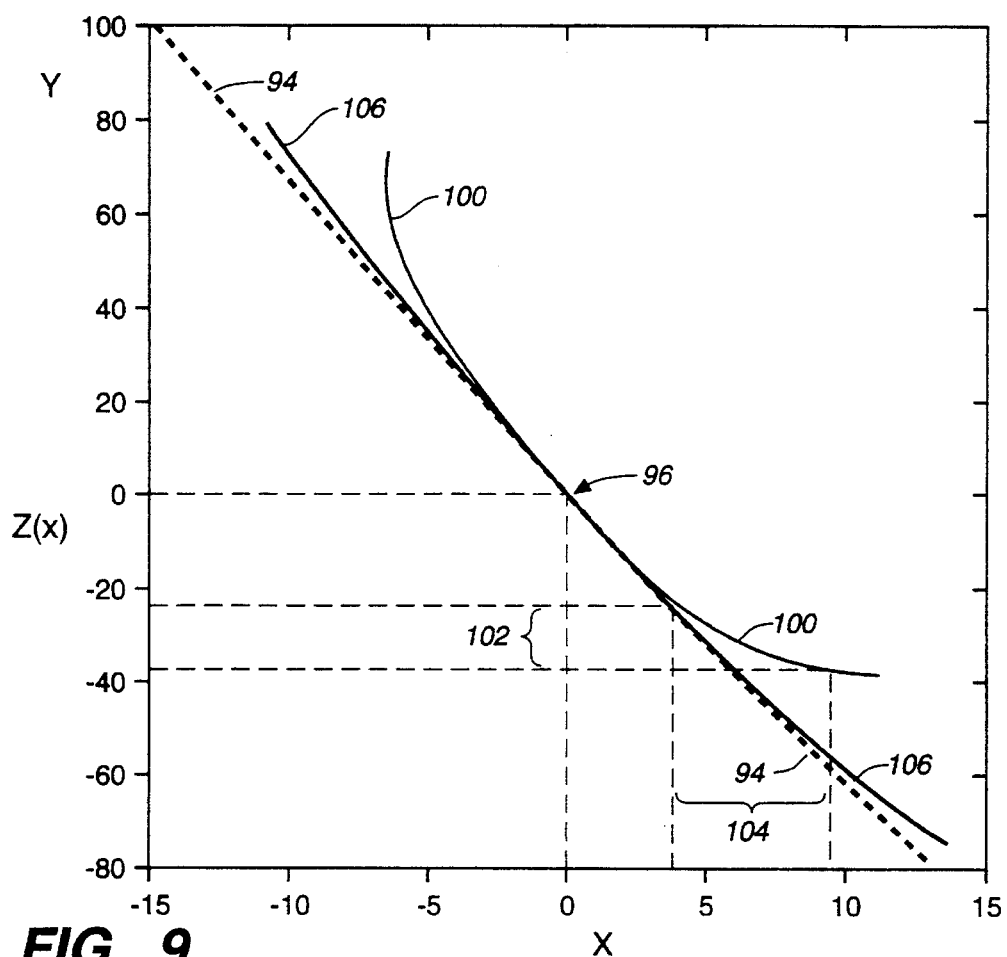
FIG._9
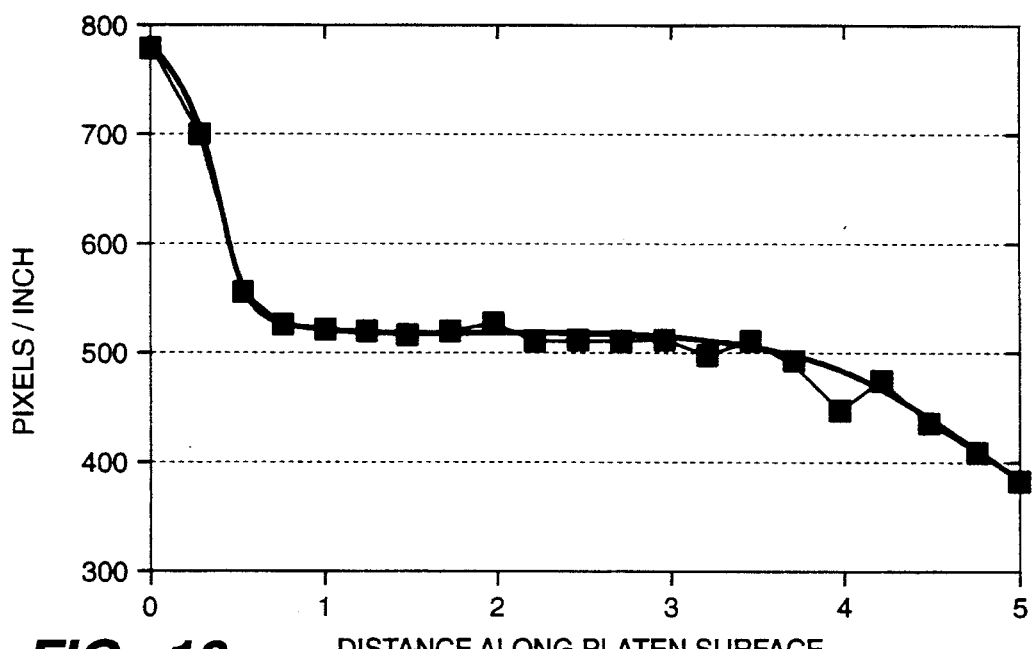
FIG._10 DISTANCE ALONG PLATEN SURFACE

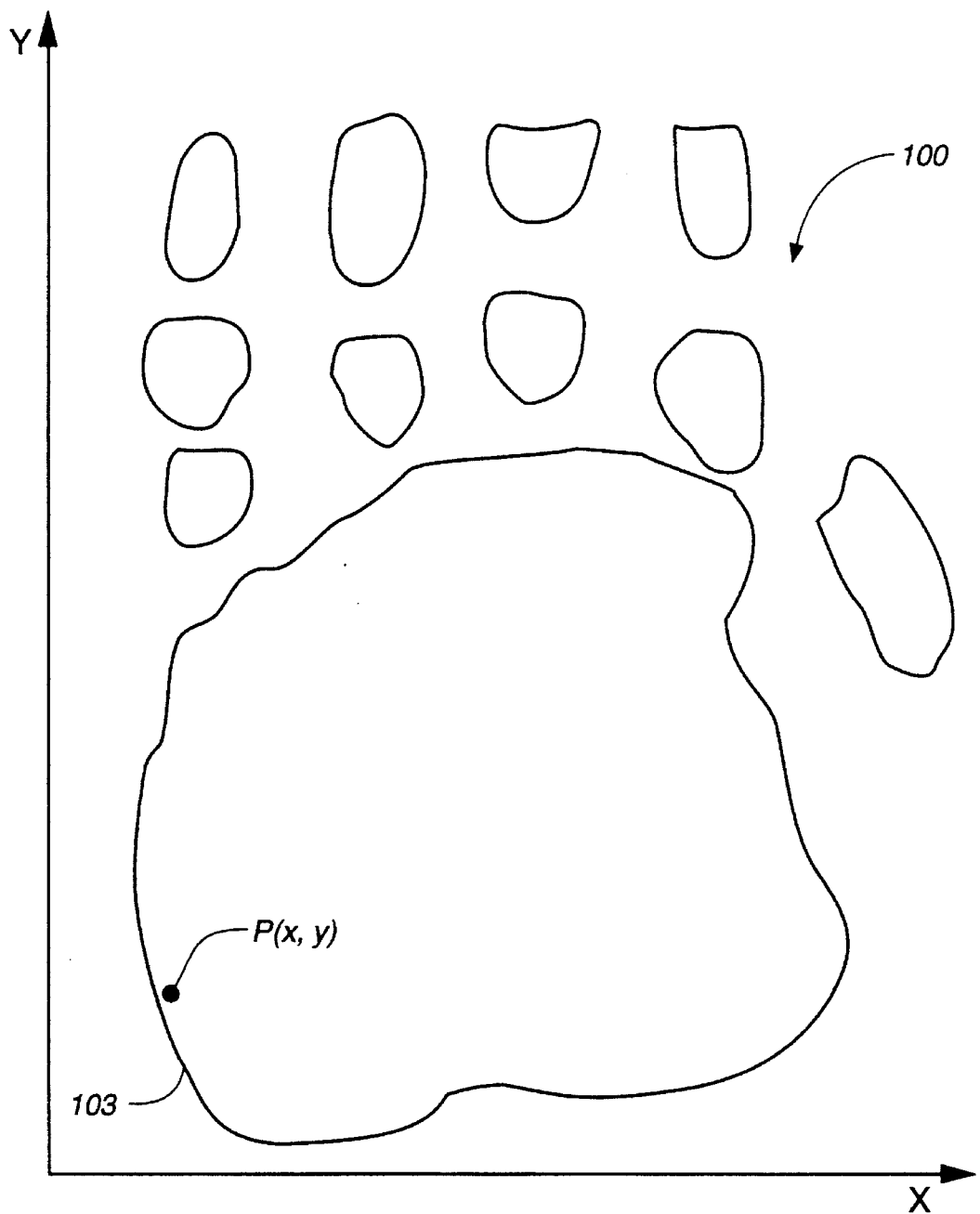
FIG._11A

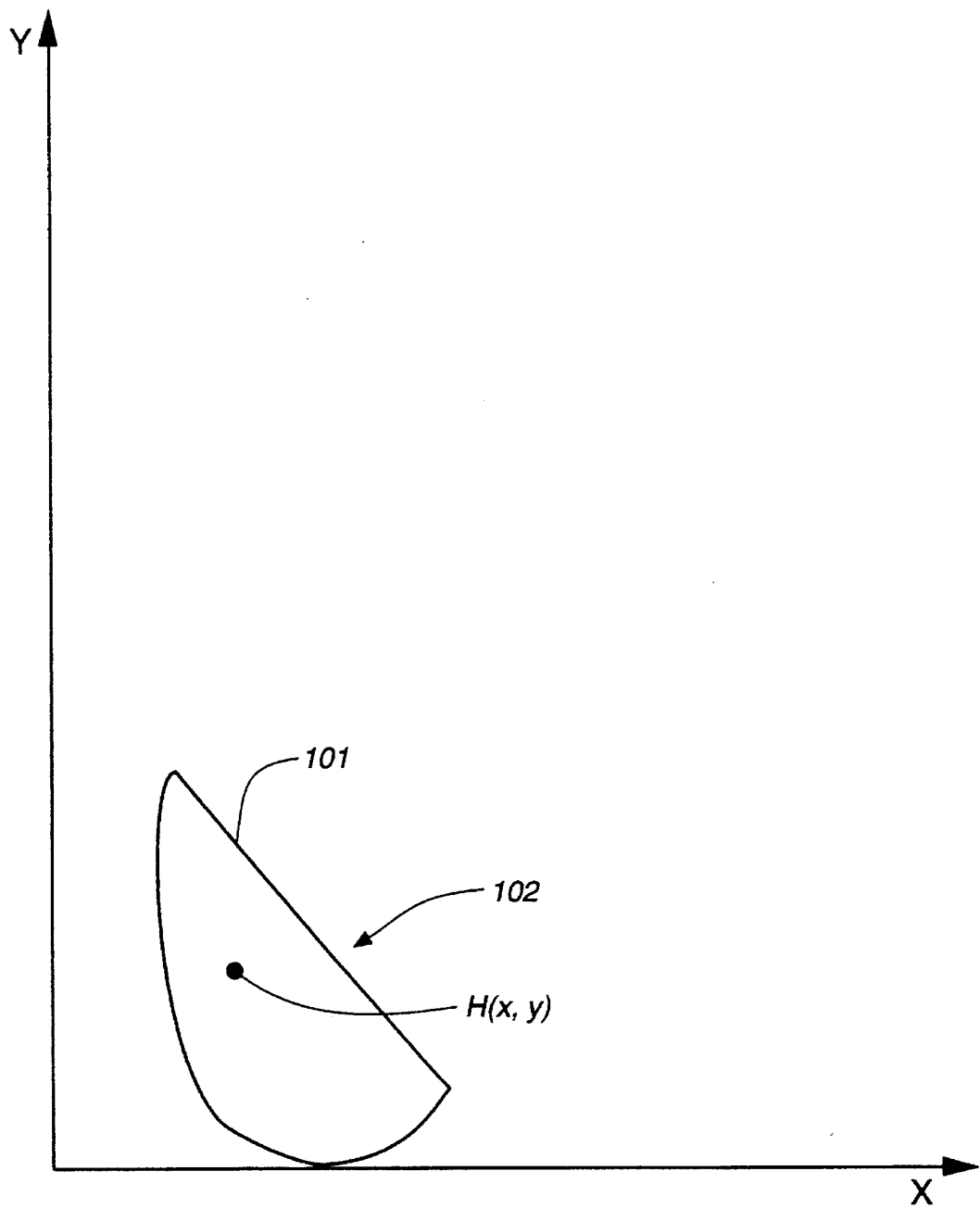
FIG._11B

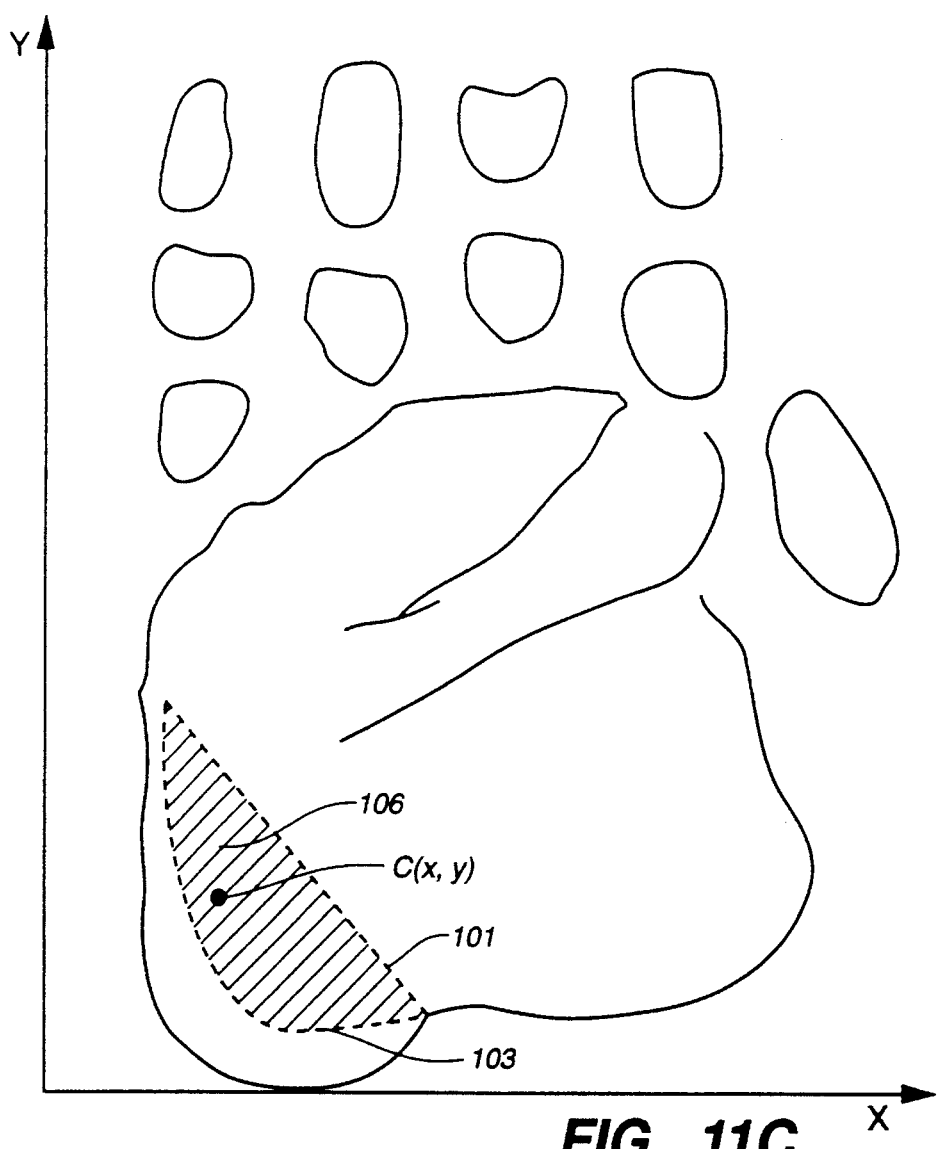
FIG._11C
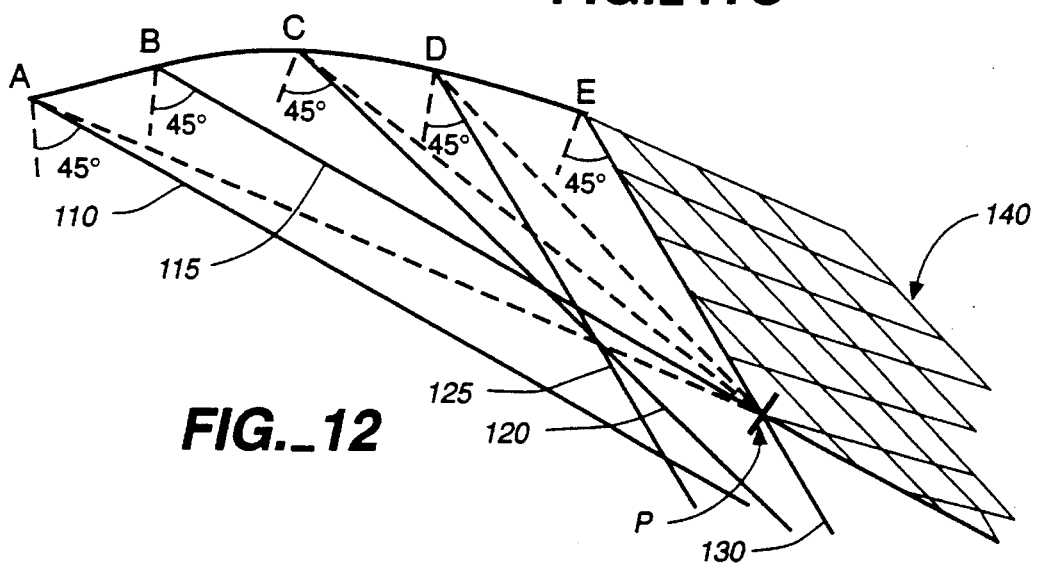
FIG._12

ELECTRO–OPTIC PALM SCANNER SYSTEM EMPLOYING A NON–PLANAR PLATEN

BACKGROUND OF THE INVENTION

The present invention relates generally to imaging apparatus, and more particularly to palmprint imaging apparatus.

Imaging of fingerprints and palmprints has universally employed the method whereby ink is applied to the surface of the skin and then transferred to a paper medium for recording. The application of ink to the skin and the subsequent transfer to paper requires an expert skilled in the technique to produce high quality images. It is common for poor quality ink fingerprints and/or palmprints to be captured, mailed to forensic laboratories for analysis, and then rejected due to poor quality. Once rejected, the only recourse is to print the subject again, if still in custody. If a long period of time has elapsed, a potential felon may have been released. Therefore, alternatives to this method are desirable to improve the accuracy of the image and present the image in the form of data which may be rapidly communicated to locations remote from the point of image capture.

Electronic means for scanning fingerprint images have been developed to avoid the problems associated with use of the ink transfer method. Images are typically scanned, presenting a planar imaging interface to the finger and a fingerprint image is developed. The electronic signals associated with this image are then digitized, stored in digital computer memory, and processed for transmission or printing. Systems employing these means are in service in civilian and law enforcement systems throughout the world.

While the problems related to fingerprint imaging have been largely solved, palmprints are still developed using the ink transfer method. Means to electro-optically scan the palm have resisted development due to basic problems related to the large size of the palm, the limited size of CCD arrays that can image the large palm, and the high cost of supporting electronics to store and process the data present in a digitized palm image. Current standards promulgated by the Federal Bureau of Intelligence and other police agencies dictate a final resolution better than 500 pixels/inch for most print imaging applications.

Advances in imaging and scanning technology have minimized the problems cited above and attempts have been made to implement electro-optic palmprint systems. However, the techniques typically applied mimic those used for fingerprint scanning by using a planar surface with the optics design scaled to handle the larger images. Unfortunately, a flat surface is not amenable to good palmprint imaging due to the shape of the palm. When the palm is applied to a flat surface, a large portion of the palm center does not contact the surface. The center of the palm carries important information that may later be used to identify the individual.

An improvement over the use of a planar system for taking inked-transfer palmprints includes the use of a rotatable cylinder. A fingerprint card is attached about the cylinder, and an inked palm is then rolled along the card as the cylinder rotates. While the resulting palmprint is of better quality than the print from a planar system because the center of the palm contacts the cylinder, it is not possible to image the heel of the hand.

Information on the heel of the hand (the area immediately below and adjacent to the smallest finger) is often inked and transferred as part of the palmprinting process. Typically this is done with planar ink transfer methods by inking the heel and the palm, and then applying the palm face-down on the card. The hand is then rolled onto the heel, much like rolling a fingerprint. The rotating cylinder ink transfer method images only the surface of the palm with no possibility of rolling the hand onto the heel while the cylinder rotates.

In each of the ink transfer methods for palmprinting described above, the use of ink impedes the ability of the palmprinter to consistently develop high quality images. Ink is messy, difficult to properly apply to the skin, difficult to transfer to a card without smear, and time consuming. Additionally, since the final product is only a card, it must be physically transported to others for analysis, requiring more time. The present invention overcomes the above-noted and other limitations of the prior art.

Accordingly, an object of the present invention is to provide an imaging apparatus capable of imaging an individual's palm.

It is a further object of the present invention is to provide an imaging apparatus capable of imaging the heel of an individual's hand.

It is still another object of the present invention to provide a print imaging apparatus which provides both palm and heel information as part of a single image.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the claims.

SUMMARY OF THE INVENTION

The present invention is directed to an electro-optic imaging system for obtaining prints of the palm and heel of an individual's hand. The system includes a platen having an upper contact surface including a first convex section for contact with a user's palm, and a second planar section for contact with the heel of a user's palm. The platen is fabricated such that total internal reflection is frustrated when a palm or heel of an individual is rested upon the platen. A pattern of the ridge structure of the palm and heel is thereby visible and may be scanned by an associated imaging system to form a palmprint combined with a heelprint. The associated imaging system includes a light source, lenses, and a linear CCD array which are all supported by a movable optical carriage. The CCD array detects changes in light intensity which give information about the ridges and valleys of the hand. During palm scanning, the optical carriage is moved in a first direction along the length of the platen. After a first scan, the palm is then rotated onto the heel of the hand, which is scanned to form another image. The palm and heel images may be combined to formed an integrated image.

BRIEF DESCRIPTION OF THE DRAWINGS

The accompanying drawings, which are incorporated in and constitute a part of the specification, illustrate a preferred embodiment of the invention and together with the general description given above and the detailed description of the preferred embodiment given below, serve to explain the principles of the invention.

FIG. 1A is a perspective view of the electro-optic imaging system of the present invention.

FIG. 1B is a perspective view of a palm placed upon an imaging apparatus utilizing the non-planar platen of the present invention.

FIG. 1C is a perspective view of the imaging apparatus of the present invention showing a hand positioned for obtaining a heelprint.

FIG. 2A is a palmprint taken using a conventional prior art planar platen.

FIG. 2B is a palmprint taken using the non-planar platen of the present invention.

FIG. 3 is a cross-sectional, schematic side view of the subject imaging apparatus as taken along section line 3—3 of FIG. 1B.

FIG. 4A is a plan view of the subject non-planar platen taken along line 4A—4A of FIG. 3 of the present invention.

FIG. 4B is a side elevational view of the non-planar platen taken along line 4B—4B of FIG. 4A.

FIG. 4C is a side elevational view of the non-planar platen taken along line 4C—4C of FIG. 4A.

FIG. 5 is an enlarged section of the schematic illustration of FIG. 3.

FIG. 6 is a side elevational view illustrating the light paths through the optical components and the non-planar platen of the subject invention.

FIG. 7 is a cross-sectional plan view of the subject imaging apparatus.

FIG. 8 is a block diagram of an electrical control system for the subject imaging apparatus.

FIG. 9 is a graph representing light reflected off of the non-planar platen detected by a light detector.

FIG. 10 is graph representing local magnification of the non-planar platen surface as imaged onto a light detector.

FIG. 11A is a graph of a palmprint.

FIG. 11B is a graph of a heelprint.

FIG. 11C is a graph showing a merged palmprint and heelprint.

FIG. 12 is a diagram showing optical characteristics of the non-planar platen.

DETAILED DESCRIPTION OF THE PREFERRED EMBODIMENTS

The present invention will be described in terms of a preferred embodiment, as illustrated in the drawings. The electro-optic palm scanner system of the present invention employs a non-planar platen to permit high-quality palmprints and heelprints to be taken. FIG. 1A depicts an electro-optic imaging apparatus 10 including a non-planar platen 12. An individual's hand 18 is placed upon platen 12 and after the hand is imaged, the corresponding print is displayed upon a video display 86. Such an imaging apparatus may be used to obtain and verify an individual's palmprints and heelprints. Imaging apparatus 10 may also be used with slight modifications to control access of individuals to facilities or computers. These modifications include the addition of a keyboard to accept identification information, as is known in the art. Image-recognition methods are disclosed in U.S. Pat. Nos. 4,537,484 and 5,067,162, both of which are assigned to the assignee of the subject application and which are both incorporated herein by reference.

Platen 12 is transparent and is constructed of acrylic in a preferred embodiment. As shown in FIG. 1B, platen 12 has a partially convex surface having a first section 11a and a second section 11b, which both extend along a longitudinal axis 19 of platen 12. For high quality images to be retrieved, it is important that the body surface to be scanned is in complete, direct contact with the surface of the platen. The upper surface 28 of platen 12 is designed to conform to most hand sizes and permits the center section of the palm to be satisfactorily imaged by the associated imaging system when the fingers are bent relative to the palm. The platen also includes planar outer sections 13a and 13b which permit high-quality imaging of the heel of the palm because the heel conforms to this flat portion of the platen. The platen is approximately 6.5 by 7 inches at its outermost edges; detailed dimensions and the optics associated with the platen will be further described below.

Imaging apparatus 10 is enclosed by a housing, or frame, 14. During operation, the palm or heel (See FIGS. 1B and 1C) of an individual's hand 18 is placed on platen 12 as shown, such that the individual's wrist extends over a front side 25 of apparatus 10. A "SCAN" switch 16 is activated to command an associated microprocessor to initiate the scanning process, as will be discussed in more detail below. Data corresponding to identifying ridges and valleys on the palm and heel is transmitted to video display 86 for review of the image. If the image is of acceptable quality, a "SAVE" switch 17 (FIG. 1A) is depressed so that the data corresponding to the scanned image is stored in a non-volatile memory or is transmitted to a central computer system, where it can be widely accessed. If the image is not satisfactory, the "SCAN" switch may be depressed again, and the scanning process repeats.

FIG. 1C shows the individual's hand 18, including palm 62 and heel 70, positioned for heelprint imaging. Heel 70 rests on the relatively flat section 13a of non-planar platen 12 so that the surface of the heel 70 is in good contact with the platen to provide a high quality image. As will be further discussed, platen 12 is symmetrically constructed such that either section 13a or 13b may be positioned adjacent front side 25 of the apparatus 14. Platen 12 rests upon the housing 14 and may be easily lifted from the housing and rotated to place portion 13b adjacent front side 25. Such reorientation might be desired if, for instance, the platen 12 became scratched.

FIG. 2A shows a palmprint 20 of an individual's hand taken in a conventional palmprinting system in which the platen is planar. As shown, the palmprint 20 from such a planar surface includes a low quality central section 22 in which the lines forming the palmprint 20 are not clearly distinguishable or visible. FIG. 2B shows a palmprint 24 of the same individual's hand taken using non-planar platen 12 of the present invention. Note the much higher resolution of central area 26 which includes ridge information and which corresponds to area 22 in FIG. 2A. Both of these prints were taken using ink and paper, but a correspondingly significant increase in the quality of the print is revealed by platen 12 in association with imaging apparatus 10.

Some of the details of the construction of platen 12 and imaging apparatus 10 may be seen in FIG. 3. Platen 12 has a curved upper surface 28 and inwardly sloping left and right sides 30 and 32, respectively, which connect to a substantially horizontal base 34. During the imaging process, the individual's hand (see FIGS. 1B and 1C) is placed upon upper surface 28 of platen 12 and a light source 36, positioned adjacent left side 30 of the platen 12, shines light through left side 30 to illuminate upper surface 28. Where no contact is made with surface 28 by hand 18, the light is internally reflected toward right side 32. Light source 36 may be a red light-emitting diode array or other suitable source in a light bar or backlight configuration so as to provide a diffuse illumination. An exemplary light ray 60 is shown as it propagates from light source 36 to the center of upper surface 28 of non-planar platen 12. Reflected ray 66 then exits platen 12 and propagates along the optical axis (coincident with ray 66) of the imaging optics, described below, to the center of detector 48.

The imaging optics consist of lenses 38, 40, and 46, and an optical band-pass filter 47. Lens 38 is a plano-concave lens which has a surface that is curved such that the rays leave lens 38 perpendicular to its surface and are not bent by the change in the index of refraction at sidewall 32. Plano-concave lens 38 thereby avoids astigmatism and color errors. Lens 40 is secured between plano-concave lens 38 and an optical detector 48 to focus the light on the detector 48. Lens 40 may be a standard camera lens with a 35 mm focal length. Lens 40 images the platen surface 28 onto the optical detector 48, and may be adjusted to focus the image onto the detector 48. Since platen surface 28 is inwardly curved, the edges of the image would be out of focus if no correction were made. Plano-convex lens 46 is mounted with its outwardly curved side toward detector 48 to compensate for the curvature of the image plane, i.e., the upper platen surface 28.

Ambient light from sources outside the palm printing apparatus can cause interference with imaging. Interference is reduced by optical band-pass filter 47 mounted between lens 40 and lens 46. The pass band of the filter is about 50 nm (nanometers), centered at a wavelength of 645 nm. This permits red light from the diode array or light source 36, which has a wavelength range of 30 nm about a center frequency of 645 nm, to pass through while rejecting light from external sources.

Detector 48 is positioned as shown at an angle of about 10 degrees with respect to the optic axis noted by ray 66. Since the platen surface 28 is at an angle of about 52 degrees with respect to the optical axis, the image of that surface will also be tilted. The tilt of the detector aligns it with the image of upper platen surface 28, thus bringing the both the edges and the center of platen surface 28 into focus. Detector 48 is preferably a linear CCD array supported by a printed circuit (PC) board 44. In the preferred embodiment, the array has 5000 pixels (pictures elements) in a 35 mm line, and is manufactured by Sony Corporation, Japan.

Light source 36, front concave lens 38, lens 40, optical band-pass filter 47, optical detector 48, field curving lens 46, and PC board 44 are all attached to an optical carriage 42. Optical carriage 42 sits upon slide bearings 50 and 52, which operably slide upon shafts 54 and 56, respectively. A stepper motor 58 is connected to optical carriage 42 and moves the assembly in one pixel increments along a longitudinal axis 19 (FIGS. 1B and 4A) of platen 12 during scanning. The details of the electrical system of the imaging apparatus will be described below in conjunction with FIGS. 7 and 8.

FIGS. 4A, 4B, and 4C show details of the construction of non-planar platen 12. FIG. 4A is a plan view of the platen illustrating its symmetrical construction. FIGS. 4A and 4B are aligned such that the side-elevational view in FIG. 4B can be directly correlated with FIG. 4A. Platen 12 is a solid prism integrally formed of acrylic having a known index of refraction of approximately 1.49. Upper surface 28 is highly polished to provide high quality images of the palm and heel being imaged. As shown in FIG. 4B, the two outer sections 13a and 13b of top surface 28 are substantially planar. Since the heel of the human hand is also relatively flat, good contact between the heel and platen surface can be made, facilitating formation of a high quality image by the imaging system. Inner sections 11a and 11b are convex, or concave as viewed from bottom surface 34, so that surface 28 closely conforms with the shape of most palms when the hand is arched such that the angle formed between the palm and fingers is approximately 15 degrees.

As shown in FIG. 4B, sides 30 and 32 are formed at an angle φ from the horizontal. Side 30 is aligned perpendicular to ray 60 noted in FIG. 3 and side 32 is aligned perpendicular to ray 66. The incidence angle of light upon surface 30 affects the angle of incidence α upon upper surface 28 of platen 12 (FIG. 5). For best performance, angle α may optimally be kept between about 45° and 53° for an acrylic prism, as further explained below. The range of optimum incidence angles upon upper surface 28 of course depends upon the composition of the prism and so may be a different value if another material is used for the platen, without departing from the scope of the present invention. Prism or non-planar platen 12 is approximately 6.5 inches wide at dimension X (FIG. 4A), and approximately 2 inches high at dimension Y (FIG. 4B). The radius of curvature of sections 11a and 11b is approximately 6 inches in a preferred embodiment. Preferably, this radius of curvature is constant to permit that palm to completely contact sections 11a and 11b.

FIG. 4C is a side elevational view (not to the scale of FIGS. 4A and 4B) of non-planar platen 12. Rims 68 extend over the edge of the sides of the platen, as shown, and support the platen as it rests within an appropriately configured opening (See FIG. 3) in housing 14. Platen 12 is approximately 3 inches high at dimension P. The distance from rim 68 to the top of highest point on the platen is shown by dimension Z, and is approximately 1 inch. The platen is approximately 7 inches wide, as indicated by dimension Q. It will be understood that many of the dimensions of the platen may be altered without departing from the scope of the present invention.

During imaging, substantially all of an individual's palm is in contact with curved portions 11a and 11b of platen 12. After the palm has been scanned, the individual must rotate his or her hand such that the heel 70 of the hand directly contacts planar section 13a. Again, the relatively flat portion of the platen 12 facilitates contact between the outside of the palm, or heel, and the platen 12. The imaging apparatus then scans the heel 70 to obtain a heelprint in a manner analogous to that of the palm imaging procedure.

Referring again to FIG. 3, as exemplary light ray 60 enters platen 12 at side surface 30, the ray 60 will continue through platen 12 as shown until it hits upper surface 28 at an angle α (see FIG. 5). The amount of refraction, according to well-known laws of optics, is a function of the index of refraction of the acrylic platen and the angle at which the ray enters side surface 30. FIG. 5 shows the path of light ray 60 in further detail as it approaches the ridges 64 and valleys 65 of palm 62 of an individual's hand 18 (FIG. 1B). At surface 28 ray 60 strikes a portion of platen 12 intermediate two adjacent skin ridges 64 of palm 62 at an angle α relative to the normal 37 to surface 28. As is well known, total internal reflection occurs when the angle of incidence α is larger than the critical angle. The critical angle is a function of the indices of refraction of the two mediums through which the light may travel; in this case the mediums are acrylic and air. When the medium opposite acrylic surface 28 is air, the critical angle is typically approximately 42°. Angle α is therefore set to a value which is somewhat greater than the critical angle so that the light striking surface 28 between skin ridges 64 will be completely reflected back through platen 12, as represented by line 66. For the subject acrylic platen 12, angle α is kept between about 45° and 53° over the whole surface 28 of the platen by adjusting the position of the entrance pupil P of the imaging optics and the corresponding position of light source 36.

Line 60' represents another light ray incident on the palm 62. Ray 60' strikes a skin ridge 64 at angle α, such ridge 64 having an index of refraction considerably greater than air. Because of the increase in the index of refraction, total internal reflection is frustrated and most of the incident light is absorbed in palm 62. Some of the incident light is also reflected by the ridge and is dispersed in several directions as represented by lines 66'. Although some of the reflected light reaches detector 48, the intensity of the light is significantly less than light reflected from surface 28 in regions adjacent the valleys 65 located between ridges 64.

As shown in FIG. 12, the entrance pupil P is positioned so that it can view internally reflected light at all points on the upper surface 28 and maintain angle α in the desired range of 45° to 53°. Solid lines 110, 115, 120, 125, and 130 emanate from points A, B, C, D, and E, respectively, at angles of 45°. An angle of 3° is added to the critical angle of 42° to allow for the rays at the edges of the entrance pupil. Acceptable locations for the entrance pupil P occur in the hatched area 140 which is the intersection of the areas above and to the right of the solid lines 110, 115, 120, 125 and 130. The point P at the intersection of the lines 115 and 130 emanating from points B and E is the point in the hatched area 140 which minimizes the tilt in the view of the upper surface 28 of the platen 12. This is therefore the optimum position for the entrance pupil P since this minimizes the burden on the optics required to correct for the tilt angle of view of the platen 12. In a preferred embodiment, entrance pupil P is 6.6 inches from the center of the platen at an angle α of 52°. Correspondingly, the sides 30 and 32 of the platen are at an angle φ of 38°, which is the complement of angle α.

FIG. 6 is another side-elevational view of platen 12 showing the light path at a number of points along upper platen surface 28. An exemplary light ray 70 is refracted upon passing through side surface 30 of platen 12. Ray 70 continues through platen 12 as explained in conjunction with FIG. 5, and reflects completely off of upper platen surface 28. Note that as expected, all rays shown in this figure exhibit total internal reflection since they intercept the platen surface 28 at an angle α greater than the critical angle.

Reflected ray 70' continues through platen 12 and exits at side 32, where it is refracted to a steep angle. It then passes through plano-concave lens 38, which refracts it back into its original path. Without lens 38, the rays along the outside edges of sections 13a and 13b of upper platen surface 28 would have severe astigmatism. Note that the rays 70' do not deviate significantly when plano-concave lens 38 is mounted close to side surface 32, and the center of the radius of curvature of lens 38 corresponds to the location of the entrance pupil of lens 40. Lens 40 limits the rays with its aperture stop and forms a real image on detector 48. Ray 70' is refracted through field curving lens 46 before intercepting the detector 40. Lens 46 has the principal purpose of focusing the edges of upper platen surface 28 onto the flat detector 48. Lens 46 also tends to reduce the distortion inherent in most systems involving tilted images. Field curving lens 46 also obviates the need for post-image manipulation, i.e. processing of the data after it is received by detector 48 in order to form an accurate image of the hand upon upper platen surface 28. Band-pass filter 47 has no significant effect on the path of the light rays 70' from light source 36.

FIG. 9 is a theoretical illustration of the effectiveness of field curving lens 46 in terms of image stretching. Image stretching is said to have occurred when the position of a ray incident on the platen is not linearly correlated to the same ray's position on the detector or linear CCD array. The horizontal axis "X" represents distance from the center to the sides of detector 48, and the vertical axis "Z(X)" represents position Z on upper platen surface 28 as a function of X, distance on detector 48. The zero (0) on the horizontal axis corresponds to the center of detector 48, and the zero on the vertical axis corresponds to a point on longitudinal axis 19 (FIG. 4A) of upper surface 28 of platen 12. FIG. 9 plots position Z on surface 28 of the platen 12, versus where a light ray incident at position Z on upper surface 28 strikes detector 48. Line 94 represents an ideal optical system in which there is a linear relationship between the position of a ray reflected from upper surface 28 of platen 12 and the position of the ray on optical detector 48, which is a linear CCD array in a preferred embodiment. Point 96 represents a light ray detected at the center (zero on the X-axis) of detector 48 which originated at the center (zero on the Y-axis, or Z(X)) of platen 12. Line 100 illustrates the stretching of an image in an optical system without a field curving lens 46. Note especially the non-linear relationship between the position of a ray on the platen 12 and its corresponding position on detector 48. Images reflected from off-center portion 102 of surface 28 are detected over proportionately larger edge section 104 of detector 48. Line 106 represents the improved performance of the optical system due to the field curving lens 46. As shown, the performance of the system more closely approximates that of the ideal 94, and image stretching occurs only at the edges of detector 48. The data received by detector 48 therefore does not require further processing to form an accurate image.

FIG. 10 is experimental data illustrating the effect of field curving lens 46, by plotting distance along upper platen surface 28 on the horizontal axis, versus magnification at detector 48 in pixels/inch on the vertical axis. The graph illustrates the relatively constant level of magnification of rays at distances between about 0.5 and 4 inches on the surface 28. The relatively linear relationship between distance along surface 28 and magnification at detector 48 is due in part to field curving lens 46. Without lens 46, FIG. 10 would show a greater amount of distortion, i.e., a much less constant level of magnification.

The size of the aperture (not shown) of lens 40 controls which rays are propagated through lens 40. Since the optics are corrected for the tilt of the image relative to the optical axis, also shown as ray 66 in FIG. 3, and the curvature upper platen surface 28, lens 40 may be operated at a relatively large stop size, i.e., f5.6, while maintaining satisfactory resolution. This permits the use of red LED (light-emitting diode) arrays instead of more intense light sources 36, such as fluorescent, xenon, or incandescent lamps. In the case of brighter light sources, there would be less reliance on corrective optics since the stop size could be reduced. Light source 36 must be of a size such that it illuminates each point on the upper surface 28 of the platen 12 at an angle such that reflected light will fall onto the detector 48. As seen in FIG. 6, the light paths converge at lens 40 due to the concavity (or convexity if viewed from outside the platen) of upper platen surface 28. Light source 36 is thus smaller than would be necessary if upper platen surface 28 were flat.

As discussed above, in a preferred embodiment, detector 48 consists of a linear array having approximately 5000 diodes which sample light along a 35 mm line. Carriage 22 moves along the approximate six-inch length (dimension Q in FIG. 4A) of longitudinal axis 19 (FIGS. 1B and 4A) of the platen to collect image information. The imaging apparatus images the top six inches along a section of the detector 48 measuring about 25 mm. This provides a sampling density greater than 500 pixels/inch; each pixel provides information along longitudinal axis 19 approximately every 0.002 inches. This provides more than adequate resolution since the skin ridges are typically spaced 0.020 inches apart. In order to provide the required resolution in the perpendicular axis, each step of motor 58 causes the incident light beam 60 to advance approximately 0.002 inches along side 30 of platen 12. The magnitude of the advance is a function of the motor 58, which typically advances 3000 steps for each imaging scan. Thus, imaging data is sufficient to produce a pixel map in excess of 3000 square pixels; a six-inch scan can be accomplished in about 3 seconds.

Optical carriage 42 moves light source 36 along platen 28 in small enough increments so that adjacent lines of skin ridges are imaged onto detector 48. The output of the detector 48 at each step is serial analog data representing the amount of light integrated since the previous step. Each pixel's output provides an analog signal capable of supporting 8 bits of data when digitized. As explained above, when a valley 65 (see FIG. 5) is scanned, detector 48 receives a maximum amount of light. When a skin ridge 64 is scanned, the array receives light which is reflected and diffused by the ridges 64 in several directions as represented by rays 66' of FIG. 5. Thus, the amount of light received at detector or CCD array 48 is reduced when light reflects off of a ridge 64.

FIG. 7 is a broken-away plan view of the subject imaging apparatus 10, and shows the positioning of optical carriage 42 during the middle of a scan. FIG. 8 is a simplified block diagram of an exemplary electrical control system for the subject imaging apparatus. Operation of imaging apparatus 10 will be explained in conjunction with both FIGS. 7 and 8. Prior to the initiation of the scan sequence, optical carriage 42 is positioned adjacent sidewall 39 of apparatus 10. When a palm or heel is not upon platen 12, substantially all of the light will be reflected to detector 48. Thus, each diode of the linear CCD array or detector 48 will receive the maximum amount of light. As noted above, light source 36, lens 38, optical band-pass filter 47, lens 40, field curving lens 46, and line array (detector) 48 are all securely attached to optical carriage 42.

The imaging process for heelprints is the same as the imaging process for palmprints; a user simply moves the hand into the appropriate position for each phase of the imaging process. When the "SCAN" switch 16 is initially depressed, the associated electro-optic scanning system scans along platen 12 from sidewall 39 to sidewall 27. A beep is emitted from the apparatus and indicates to the user that the hand should be rotated about 30° so that the heel 70 rests upon section 13a. The scanning system then scans in a direction from sidewall 27 to sidewall 39.

More specifically, when a user depresses "SCAN" switch 16, a microprocessor 72 on a processor board 82 signals a motor driver 74 to activate lamp or light source 36, stepper motor 58, and a limit sensor 76. At each step of motor 58, a line along the surface of platen 12 is imaged onto detector 48. The stepper motor 58 moves the optical carriage 42 from its position adjacent sidewall 39 to a position adjacent sidewall 27. While the carriage 42 is moving, line array or detector 48 detects light signals corresponding to the ridges 64 and valleys 65 of the hand. As the carriage 22 is moved each step, adjacent lines of upper platen surface 28 are imaged onto the detector. At each step, this line of data is output as serial analog data. The set of one dimensional scans corresponding to the steps along longitudinal axis 19 is collected to form a two dimensional image of the hand. Limit sensor 76 then detects the position of the stepper motor 58 at a position adjacent sidewall 27 and signals motor driver 74 to stop stepper motor 58.

As shown schematically in FIG. 8, detector 48 is coupled to a CCD driver 78, which transmits image data to a frame grabber 80. As shown, frame grabber 80 is coupled to a DRAM 84 (Dynamic Random Access Memory). The frame grabber 80 samples the analog signal from the CCD driver 78 at a rate synchronized with the output of the CCD array 48, smooths the data, and resamples the data to provide a digital output. It should be noted that the pixel values of the CCD do not necessarily correspond to the pixels of the final image due to the resampling by the frame grabber 80. The print is immediately available on video display 86 for review, as shown in FIG. 1A.

As previously mentioned, the final output of the electro-optic imaging apparatus 10 satisfies the FBI requirement for a final resolution better than 500 pixels/inch. This is accomplished along the longitudinal axis 19 by selecting the pixel clocking rate in the frame grabber 80. The frame grabber synchronizes the scans from the detector 48, digitizes the data to 8 bits, and stores it in memory. In the perpendicular dimension, sampling is accomplished by having the stepping motor 58 move carriage 22 in 0.002 inch steps. The total palm image is six inches by six inches. The scanning rate is limited by the rate at which data may be read out of detector 48, digitized by frame grabber 80, and stored in memory 84.

When the palm scanning operation is complete, limit sensor 76 signals motor driver 74 to stop, and microprocessor 72 controls a signal, such as a beep or a flashing light, to indicate to the user that palm scanning is complete. A short pause then permits the user to rotate the hand such that the heel of the palm rests directly and completely upon the flat portion 13a of upper surface 28 of platen 12, as shown in FIG. 1C. Microprocessor 72 then initiates movement of optical carriage 42 via stepper motor 58 in the opposite direction toward sidewall 39. During this transition, a heel-print image may be formed. Alternately, the optical carriage may return to its home position adjacent sidewall 39 and then a second scan is initiated from sidewall 39 to sidewall 27 to form the heelprint image. The former approach provides faster imaging, but the latter method provides higher image accuracy when the two images are later combined.

A graphics processor 88 may be employed to merge the palmprint data with the heelprint data to form a complete image. This process is illustrated in FIGS. 11A, 11B, and 11C, where identifying valleys and ridges are not depicted. FIG. 11A is a plot of the outline of a palmprint 100 having a lower-left boundary 103. FIG. 11B is a plot of the image taken by rotating the hand onto the heel, as shown in FIG. 1C, to form a heelprint 102 having an upper-left boundary 101.

Briefly, the images are merged by comparing the pixel values at corresponding points on both images 100 and 102, and then maintaining the pixel value from whichever image 100 or 102 has stored the darkest pixel value. This comparison is made for every pixel in the image until the final combined image is formed. For example, if P(x,y) is the pixel value in the palm image 100, and H(x,y) is the pixel value in the heel image 102 at the same location x, y on the upper platen surface 28, the final value in the combined image C(x,y) will be set equal to the darker of pixel values P(x,y) and H(x,y). FIG. 11C shows the overlapped area 106 bounded by heelprint line 101 and palmprint line 103, in which data is contributed from both the palm 100 and heel 102 image. Therefore, a system operator should avoid both sliding the hand and smearing the image by carefully rolling the palm onto the heel.

Alternate means of combining the image include comparing the individual palm and heel images with the image of the blank platen or with each other to determine what areas contain valid print data. If any sliding occurs when the hand is rolled from palm contact to heel contact, the signal processor 90 may also be equipped to realign the two images by translation and rotation of the images. Additionally processor 90 provides a fast computational facility for manipulation of the image for enhancing contrast, assessing the quality of the images, correcting geometric distortion, and reformatting for storage or printing onto a host system. Processor 90 can also be programmed for data compression of the images using one of the available gray-scale compression algorithms.

After processing by processor 90, image data is conveyed to a small computer system interface (SCSI) 92 for communication with a host computer for storage, printing, and communication to other destinations. If the imaging apparatus 10 is packaged with supporting processors, i.e. graphics processor 88, signal processor 90, microprocessor 72, frame grabber 80, and large DRAM 84, the cost of interconnecting the equipment is reduced. However, an efficient and flexible interface with a host workstation (not shown) is still necessary. The transmission of palmprint images to the host workstation involves megabytes of data. At a maximum data rate of 10 MB/sec, the SCSI interface 92 is well suited for this task. SCSI interface 92 is also supported on a large variety of computers and workstations. The host workstation provides the user with the ability to control the palm printing apparatus. With an SCSI interface, a regular fingerprinting device can also be connected with the workstation, to provide a complete booking system for law enforcement applications. The host workstation may support storage of the finger and palm print images, communication and printing.

The apparatus of the present invention has been described in terms of a preferred embodiment. However, many different embodiments are possible, and include: a non-planar platen having a different shape; the platen may have a mound on its top to conform to palm shapes; the platen may be formed of a material other than acrylic, such as glass, and the range of optimal incidence angles may be correspondingly altered; a CCD array area may be used instead of a linear array such that movement of the optical carriage is obviated; photographic film may be used to detect the reflected light; or different lens assemblies may be employed.

In summary, an electro-optic palm scanner employing a non-planar platen has been described. The optimal shape of the platen permits high quality prints to be formed by the imaging system.

The present invention has been described in terms of a preferred embodiment. The invention, however, is not limited to the embodiment depicted and described. Rather, the scope of the invention is defined by the appended claims.

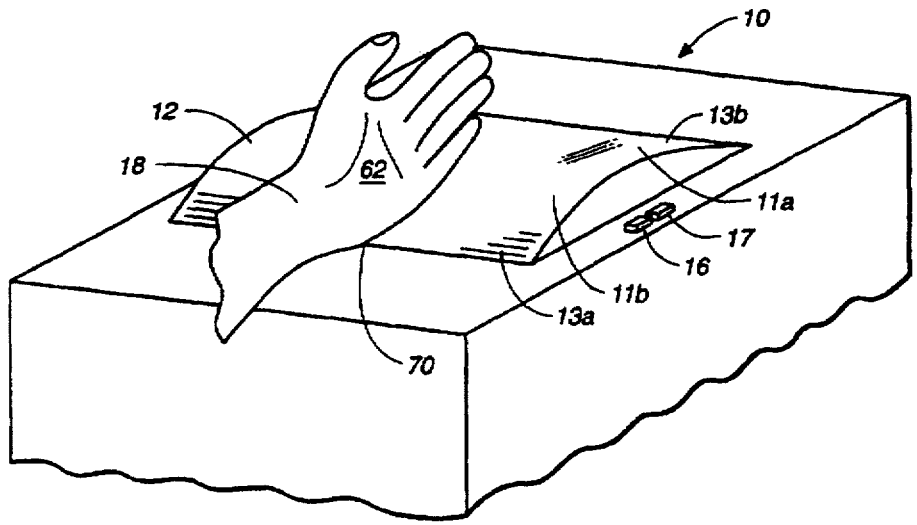

What is claimed is:

1. A platen for use in obtaining an image of a heel and palm of an individual's hand having identifying valleys and ridges, comprising:

first and second sides;

a bottom surface continuous with said first and second sides; and an upper contact surface continuous with said first and second sides and having a concave section relative to said bottom surface for permitting imaging of the palm, and a planar section for permitting imaging of the heel.

2. The platen of claim 1 wherein said concave section has a constant radius of curvature for permitting the palm to completely contact said concave section such that an image of the palm may be formed.

3. The platen of claim 1 wherein said platen is symmetrically constructed such that said concave section is in the center of said upper contact surface, said planar section comprises a first planar portion and a second planar portion, said first and second planar portions being on opposite sides of said concave section.

4. The platen as claimed in claim 1 wherein said platen is transparent, said first side functions as light-input surface and said second side functions as a light-output surface, said light-input surface being formed at an angle to the horizontal so that illuminated regions of said contact surface not in contact with the identifying ridges of the hand provide total internal reflection.

5. The platen of claim 1 wherein said platen is formed of acrylic and is transparent.

6. The platen of claim 5 wherein said first side is formed such that the angle of incidence of light upon said contact surface is between about 45° and 53°.

7. An electro-optic imaging system for obtaining prints of a hand having fingers, a palm and a heel, each with identifying ridges and valleys, comprising:

a transparent platen including a contact surface having a convex section for permitting contact with the palm and a substantially planar section for permitting contact with the heel, a light-input surface, and a light-output surface;

a light source providing light incident on said light-input surface for illuminating said contact surface so that illuminated regions of said contact surface not in contact with the identifying ridges provide total internal reflection; and a light detector for receiving light from said light source which has passed through said light-input surface, reflected off of said contact surface, and passed out of said platen through said light-output surface.

8. The imaging system as claimed in claim 7 further including processing means for obtaining a first image of the palm and a second image of the heel, and merging said first and second images to provide an image of said hand which includes the palm and the heel.

9. The imaging system as claimed in claim 7 wherein said light detector is a linear array of light sensors, and said system further includes drive means for moving said light detector relative to said platen.

10. The imaging system as claimed in claim 7 further including:

a first lens for receiving light from said light-output surface and bending light such that light rays leave said first lens perpendicular to its surface, thereby preventing astigmatism;

a second lens for focusing light from said first lens onto said light detector; and a third lens disposed between said second lens and said light detector for directing light onto said light detector and for compensating for the curvature of said convex section of said platen.

11. A method for obtaining prints of a palm and heel of a hand having identifying ridges and valleys, said method comprising the steps of:

placing the palm upon an arched surface of a non-planar platen;

scanning the palm to obtain palm information for forming an image of the palm;

rolling the hand to position the heel upon a planar section of the platen;

scanning the heel to obtain heel information for forming an image of the heel; and merging said heel information and said palm information to form a continuous image of the palm and hand.

12. A method of merging data from a palm scan and a heel scan to provide a continuous image of the palm and hand, said method comprising the steps of:

scanning a palm to obtain palmprint information in the form of light intensity data;

rolling the hand from palm to heel;

scanning a heel to obtain heelprint information in the form of light intensity data; and merging said heelprint information with said palmprint information by comparing palmprint light intensity data with heelprint light intensity data for each element of an array.

13. A method of obtaining imaging data of the palm and heel of an individual in an electro-optic imaging system, comprising the steps of:

placing the palm upon a platen;

scanning the palm to obtain palmprint data;

signalling the user that the palmprint has been taken;

rolling the hand from the palm to the heel while keeping the hand against the platen; and scanning the heel to obtain heelprint data.

14. An electro-optic imaging system for obtaining prints of portions of a hand having identifying ridges and valleys, comprising:

a platen having a bottom surface and an upper contact surface for supporting a hand to be imaged, said upper contact surface including a first substantially planar portion and a second portion being concave relative to said bottom surface;

a frame;

a carriage movably secured to said frame;

a drive for moving said carriage on said frame;

a light source secured to said carriage which directs light toward said upper contact surface; and a light detector secured to said carriage which receives light from said upper contact surface, the position of said light detector being fixed with respect to said light source.

15. The electro-optic imaging system as claimed in claim 14, further including an image processing means mounted within said frame.

16. The imaging system as claimed in claim 14 wherein said concave portion of said upper contact surface has a constant radius of curvature to permit a palm of a user to completely contact said concave portion.

17. The imaging system as claimed in claim 14 further including:

a first lens for receiving light from said light-output surface and bending light such that light rays leave said first lens perpendicular to its surface, thereby preventing astigmatism;

a second lens for focusing light from said first lens onto said light detector; and a field curving lens disposed between said second lens and said light detector.

18. The imaging apparatus as claimed in claim 17 wherein said light detector is a charge-coupled device array.

19. The imaging apparatus as claimed in claim 18 wherein said charge-coupled device array is a linear array.

20. The imaging apparatus as claimed in claim 14 wherein said drive includes a motor and a control means for controlling said motor and wherein said control means causes said carriage to be moved to perform an imaging scan of the hand.

* * * * *

UNITED STATES PATENT AND TRADEMARK OFFICE
CERTIFICATE OF CORRECTION

Page 1 of 2

PATENT NO.   : 5,528,355
DATED        : June 18, 1996
INVENTOR(S)  : Daniel F. Maase; Thomas F. Sartor It is certified that error appears in the above-identified patent and that said Letters Patent is hereby corrected as shown below:

Assignee,
Correct spelling of Assignee's name.
Change -- Idnetix Incorporated -- to -- Identix Incorporated --

Signed and Sealed this

Nineteenth Day of February, 2002

Attest:

JAMES E. ROGAN
Attesting Officer   Director of the United States Patent and Trademark Office

United States Patent [19]

Maase et al.

[11] Patent Number: 5,528,355
[45] Date of Patent: Jun. 18, 1996

[54] ELECTRO-OPTIC PALM SCANNER SYSTEM EMPLOYING A NON-PLANAR PLATEN

[75] Inventors: Daniel F. Maase, Campbell; Thomas F. Sartor, Sunnyvale, both of Calif.

[73] Assignee: Idnetix Incorporated, Sunnyvale, Calif.

[21] Appl. No.: 209,804

[22] Filed: Mar. 11, 1994

[51] Int. Cl.$^6$ .................................................. G06K 9/00
[52] U.S. Cl. ............................................. 356/71; 382/115
[58] Field of Search ........................... 356/71; 782/115, 782/124, 125, 126, 127

[56] References Cited

U.S. PATENT DOCUMENTS

| | | | |
|---|---|---|---|
| 3,581,282 | 5/1971 | Altman | 340/149 |
| 3,677,154 | 7/1972 | Lee et al. | 95/1.1 |
| 3,804,524 | 4/1974 | Jocoy et al. | 356/138 |
| 3,867,164 | 2/1975 | Orlando et al. | 117/0.5 |
| 3,975,711 | 8/1976 | McMahon | 340/146.3 |
| 4,032,889 | 6/1977 | Nassimbene | 340/146.3 |
| 4,152,056 | 5/1979 | Fowler | 354/62 |
| 4,186,378 | 1/1980 | Moulton | 340/146.3 E |
| 4,227,805 | 10/1980 | Schiller | 356/71 |
| 4,537,484 | 8/1985 | Fowler et al. | 354/62 |
| 4,792,226 | 12/1988 | Fishbine et al. | 356/71 |
| 5,067,162 | 11/1991 | Driscoll, Jr. et al. | 382/5 |
| 5,335,288 | 8/1994 | Faulkner | 362/4 |

*Primary Examiner*—Richard A. Rosenberger
*Attorney, Agent, or Firm*—William J. Egan, III; Fish & Richardson

[57] ABSTRACT

An electro-optic palm scanner system employing a non-planar platen for obtaining high quality palmprints and heelprints. The platen includes an upper contact surface having a convex portion for contacting a palm to be imaged, and a planar portion for contacting the heel of the hand. The imaging system includes an optical carriage movably secured to a frame. The carriage supports a light source, lens system, and light detector. Total internal reflection occurs when light is incident on the platen at an angle greater than a critical angle of the platen, providing identifying information. The detector may include a linear CCD array which detects ridges and valleys in the hand to obtain image data. The image data is processed and the corresponding print of the heel or hand may be displayed on a video screen, and stored. The images of the palm and heel may be merged to form a single image.

20 Claims, 12 Drawing Sheets